US011802166B2

(12) United States Patent
Uraki et al.

(10) Patent No.: US 11,802,166 B2
(45) Date of Patent: Oct. 31, 2023

(54) CELLULOSE ACETATE FILM AND METHOD FOR PRODUCING CELLULOSE ACETATE FILM

(71) Applicants: NATIONAL UNIVERSITY CORPORATION HOKKAIDO UNIVERSITY, Sapporo (JP); DAICEL CORPORATION, Osaka (JP)

(72) Inventors: Yasumitsu Uraki, Sapporo (JP); Haruo Konno, Tokyo (JP); Shu Shimamoto, Tokyo (JP)

(73) Assignees: NATIONAL UNIVERSITY CORPORATION HOKKAIDO UNIVERSITY, Sapporo (JP); DAICEL CORPORATION, Osaka (JP)

( * ) Notice: Subject to any disclaimer, the term of this patent is extended or adjusted under 35 U.S.C. 154(b) by 171 days.

(21) Appl. No.: 17/434,230

(22) PCT Filed: Feb. 26, 2020

(86) PCT No.: PCT/JP2020/007773
§ 371 (c)(1),
(2) Date: Aug. 26, 2021

(87) PCT Pub. No.: WO2020/175557
PCT Pub. Date: Sep. 3, 2020

(65) Prior Publication Data
US 2022/0135706 A1    May 5, 2022

(30) Foreign Application Priority Data
Feb. 28, 2019    (JP) .................................. 2019-035467

(51) Int. Cl.
*C08B 3/06* (2006.01)
*C08B 15/04* (2006.01)
*C08H 8/00* (2010.01)
*C08J 5/18* (2006.01)
*C08L 1/12* (2006.01)

(52) U.S. Cl.
CPC ............... *C08B 3/06* (2013.01); *C08B 15/04* (2013.01); *C08H 8/00* (2013.01); *C08J 5/18* (2013.01); *C08L 1/12* (2013.01); *C08L 2203/16* (2013.01)

(58) Field of Classification Search
CPC ...................................................... C08B 3/06
See application file for complete search history.

(56) References Cited

U.S. PATENT DOCUMENTS

| 6,117,545 A * | 9/2000 | Cavaille | C08B 3/20 |
| | | | 428/113 |
| 2006/0105115 A1* | 5/2006 | Kashima | C09K 19/38 |
| | | | 428/1.1 |
| 2007/0059458 A1* | 3/2007 | Nishiura | C08J 5/18 |
| | | | 428/1.31 |
| 2019/0127889 A1 | 5/2019 | Uraki et al. | |

FOREIGN PATENT DOCUMENTS

| CN | 102660050 A | 9/2012 | |
| CN | 102279152 B * | 4/2013 | |
| EP | 1280559 B1 * | 3/2006 | ......... A61K 47/6951 |
| EP | 3428327 A1 * | 1/2019 | ............ B82Y 30/00 |
| JP | 2011-148914 A | 8/2011 | |
| JP | 2012-36529 A | 2/2012 | |
| JP | 2016-211116 A | 12/2016 | |
| JP | 2018-154699 A | 10/2018 | |
| WO | WO 2010/073678 A1 | 7/2010 | |
| WO | WO 2017/155054 A1 | 9/2017 | |

OTHER PUBLICATIONS

Office Action dated Mar. 23, 2022, in Chinese Patent Application No. 202080007419.3.
International Preliminary Report on Patentability and English translation of the Written Opinion of the International Searching Authority for International Application No. PCT/JP2020/007773, dated Aug. 25, 2021.
Kobayashi et al., "Investigation of the structure and interaction of cellulose triacetate I crystal using ab initio calculations," Carbohydrate Research, vol. 388, 2014 (Available online Feb. 21, 2014), pp. 61-66.
Nishino et al., "Elastic Modulus of the Crystalline Regions of Cellulose Triesters," Journal of Polymer Science: Part B: Polymer Physics, vol. 33, 1995 (Revised Aug. 10, 1994), pp. 611-618.
Roche et al., "Three-Dimensional Crystalline Structure of Cellulose Triacetate II," Macromolecules, vol. 11, No. 1, Jan.-Feb. 1978, pp. 86-94.
Sikorski et al., "Crystal Structure of Cellulose Triacetate I," Macromolecules, vol. 37, 2004 (Revised Apr. 1, 2004), pp. 4547-4553.
Stipanovic et al., "Molecular and crystal structure of cellulose triacetate I: a parallel chain structure," Polymer, vol. 19, Jan. 1978, pp. 3-8.
Sugiyama et al., "Electron Diffraction Study on the Two Crystalline Phases Ocurring in Native Cellulose from an Algal Cell Wall," Macromolecules, vol. 24, No. 14, 1991 (Revised Feb. 12, 1991), pp. 4168-4175.
Wada et al., "X-Ray Diffraction Study of the Thermal Expansion Behavior of Cellulose Triacetate I," Journal of Polymer Science: Part B: Polymer Physics, vol. 47, 2009 (Jan. 21, 2009), pp. 517-523.
Chinese Office Action and Search Report dated Aug. 16, 2022 for Applicatian No. 202080007419.3 with an English Translation.

(Continued)

*Primary Examiner* — Leigh C Maier
*Assistant Examiner* — Everett White
(74) *Attorney, Agent, or Firm* — Birch, Stewart, Kolasch & Birch, LLP

(57) ABSTRACT

An object of the present disclosure is to provide a cellulose acetate film having excellent bending properties and high transparency. The subject cellulose acetate film contains cellulose acetate having a cellulose triacetate I crystal structure, the cellulose acetate film having a light transmittance of 70% or higher at 660 nm.

13 Claims, No Drawings

(56) References Cited

OTHER PUBLICATIONS

Wang et al., "Structure and Prapemes of Cellulose Triacetate", China Academic Journal Electronic Publishing House, Aug. 2007, pp. 49-52, with an English abstract.
Extended European Search Report for European Application No. 20763680.4, dated Oct. 19, 2022.

* cited by examiner

US 11,802,166 B2

CELLULOSE ACETATE FILM AND METHOD FOR PRODUCING CELLULOSE ACETATE FILM

TECHNICAL FIELD

The present invention relates to a cellulose acetate film and a method for producing a cellulose acetate film.

BACKGROUND ART

In recent years, cellulose has been attracting attention as a naturally-occurring, environmentally-friendly biomass material. As the most abundant polysaccharide on Earth, cellulose can be found in the cell walls of plants, excretions of microorganisms, and the mantle of the ascidians. Cellulose has biodegradability, high crystallinity, and excellent stability and safety. Therefore, it is expected to be applied to a variety of fields. Among these, cellulose nanofibers, which are obtained by subjecting a cellulose material such as wood pulp to mechanical fibrillation treatment and refining the material to fibrils or microfibrils, have characteristics such as high strength and high heat resistance, and are being actively studied as additives for resins and as various functional base materials.

Proposed applications of cellulose nanofibers include a filter medium in the shape of a sheet, a battery member such as a separator, and a transparent base material. For example, Patent Document 1 describes a method for producing a sheet-like non-woven fabric by subjecting a cellulose nanofiber dispersion to a papermaking process, the resulting product being used as a filter medium or battery member. The document also describes that: heat resistance and solvent resistance as a sheet can be exhibited due to the degree of polymerization of the cellulose fibers being greater than or equal to 500; and the strength of the sheet can be improved by adding a water-soluble polymer such as a water-soluble polysaccharide or a water-soluble polysaccharide derivative. However, although strength of the sheet is improved when only cellulose having a high degree of polymerization is used, the sheet becomes hard and brittle and has worse bending properties. As a result, handleability, moldability, and processability are significantly reduced, leading to problems in actual use. Furthermore, in a system in which a water-soluble polysaccharide or a water-soluble polysaccharide derivative is added, the number of work processes increases; meanwhile, the added water-soluble polymer is removed together with the filtrate during the papermaking process, resulting in a low yield, and making it difficult to benefit from the addition of water-soluble polymer.

Patent Document 2 describes a method for producing a microfibrous cellulose sheet, and that the fiber length of the microfibrous cellulose is preferably from 1 to 1000 μm while the aspect ratio thereof is preferably from 100 to 30000. However, the resulting sheet of cellulose fibers in these ranges tends to be cloudy.

Patent Document 3 describes a cellulose nanofiber sheet containing chemically modified cellulose nanofibers and non-chemically modified cellulose nanofibers. The document also describes a cellulose nanofiber sheet having a light transmittance of 70% or higher at 660 nm and an elongation of 2% or higher after being conditioned at 23° C. in a humidity of 50%. In particular, one example disclosed a cellulose nanofiber sheet having an elongation of 6.8%. However, bending properties such as folding endurance are, in general, decided by elongation (elongation at break), and while higher elongation tends to lead to better bending properties, a sheet-like material (or film-like material) having even better bending properties is desirable from the perspective of handleability, moldability, and processability of the sheet.

CITATION LIST

Patent Document

Patent Document 1: JP 2012-036529 A
Patent Document 2: WO 2010/073678 A1
Patent Document 3: JP 2016-211116 A

Non-Patent Literature

Non-Patent Literature 1: Takashi Nishino et al., Elastic modulus of the crystalline regions of cellulose triesters, Journal of Polymer Science Part B: Polymer Physics, March 1995, pp 611-618
Non-Patent Literature 2: Junji Sugiyama et al., Electron diffraction study on the two crystalline phases occurring in native cellulose from an algal cell wall, Macromolecules, 1991, 24 (14), pp 4168-4175
Non-Patent Literature 3: E. Roche et al., Three-Dimensional Crystalline Structure of Cellulose Triacetate II, Macromolecules, 1978, 11 (1), pp 86-94
Non-Patent Literature 4: Stipanovic A J et al., Molecular and crystal structure of cellulose triacetate I: A parallel chain structure, Polymer, 1978, 19 (1), pp 3-8.
Non-Patent Literature 5: Masahisa Wada et al., X-ray diffraction study of the thermal expansion behavior of cellulose triacetate I, Journal of Polymer Science Part B: Polymer Physics, Jan. 21, 2009, pp 517-523
Non-Patent Literature 6: Takanori Kobayashi et al., Investigation of the structure and interaction of cellulose triacetate I crystal using ab initio calculations, Carbohydrate Research, Mar. 31, 2014, Volume 388, pp 61-66
Non-Patent Literature 7: Pawel Sikorski et al., Crystal Structure of Cellulose Triacetate I, Macromolecules, 2004, 37 (12), pp 4547-4553

SUMMARY OF INVENTION

Technical Problem

As described above, it has been difficult to obtain a cellulose acetate film having excellent bending properties and transparency from naturally-derived or chemically-modified cellulose. In particular, it has been difficult to obtain a cellulose acetate film having both a light transmittance of 70% or higher at 660 nm and an elongation of 7% or higher.

An object of the present disclosure is to provide a cellulose acetate film having excellent bending properties and high transparency.

Solution to Problem

The present disclosure firstly relates to a cellulose acetate film containing cellulose acetate having a cellulose triacetate I crystal structure, the cellulose acetate film having a light transmittance of 70% or higher at 660 nm.

The cellulose acetate film may have an elongation of 7% or higher when conditioned at 23° C. and 50% relative humidity.

A temperature, at which a weight loss of the cellulose acetate film relative to weight at 100° C. reaches 5%, may be 200° C. or higher when the cellulose acetate film is heated at a heating rate of 10° C./min under a nitrogen atmosphere.

A temperature at which the weight loss of the cellulose acetate film reaches 5% may be 250° C. or higher.

A combined sulfuric acid content in the cellulose acetate of the cellulose acetate film may be from 20 ppm to 500 ppm.

The present disclosure secondly relates to a method for producing a cellulose acetate film, the method including: acetylating raw material cellulose by reacting the raw material cellulose with acetic anhydride in a solvent containing a poor solvent for cellulose acetate and acetic acid; diluting the cellulose acetate obtained by the acetylation with a dispersion medium to prepare a dispersion; fibrillating the cellulose acetate in the dispersion; removing non-fibrillated fibers from the fibrillated cellulose acetate; dialyzing cellulose acetate from which the non-fibrillated fibers have been removed against water; and drying the dialyzed cellulose acetate to form a film.

Advantageous Effects of Invention

The present disclosure can provide a cellulose acetate film having excellent bending properties and high transparency.

DESCRIPTION OF EMBODIMENTS

Cellulose Acetate Film

The cellulose acetate film according to an embodiment of the present disclosure contains cellulose acetate having a cellulose triacetate I crystal structure, the cellulose acetate film having a light transmittance of 70% or higher at 660 nm. Note that in the present disclosure, the terms "sheet" and "film" both indicate the shape of a thin film and do not refer to objects that are specifically distinguished by thickness.

Light Transmittance

The cellulose acetate film according to an embodiment of the present disclosure has a light transmittance of 70% or higher at 660 nm. The light transmittance is preferably not less than 80%, more preferably not less than 85%. When light transmittance at 660 nm is less than 70%, visible light cannot be efficiently transmitted, leading to inferior transparency. In addition, while the light transmittance is preferably higher, with 100% being the most preferable, it may be 95% or below when taking into consideration that reflection due to the difference in refractive index at the interface between the air and the film is inevitable.

In addition, the cellulose acetate film according to an embodiment of the present disclosure can not be easily colored even by heating and can maintain excellent transparency. In other words, the cellulose acetate film according to an embodiment of the present disclosure has excellent heat resistance. The cellulose acetate film according to an embodiment of the present disclosure preferably has a light transmittance at 450 nm of 70% or higher, more preferably 80% or higher, even after being subjected to heating for 3 hours at 100° C.

The light transmittance at 450 nm and 660 nm described above may both be measured by a spectrophotometer.

Elongation

The cellulose acetate film according to an embodiment of the present disclosure preferably has an elongation of 7% or higher, more preferably 8% or higher, when conditioned at 23° C. and 50% relative humidity. When the elongation is 7% or higher, the cellulose acetate film according to an embodiment of the present disclosure has higher folding endurance and excellent bending properties. Furthermore, the elongation may be 16% and below from the perspective that elastic modulus tends to be negatively affected when elongation is too high.

The elongation may be measured by conditioning a cellulose acetate film at 23° C. and 50% relative humidity for approximately 12 to 20 hours, and then performing a tensile test at, for example, a tensile width of 10 mm, a span of 10 mm, and a speed of 5 mm/min.

Temperature at which Weight Loss Reaches 5%

The cellulose acetate film according to an embodiment of the present disclosure has a temperature, at which a weight loss relative to weight at 100° C. reaches 5%, of preferably 200° C. or higher, more preferably 220° C. or higher, and even more preferably 250° C. or higher, when the cellulose acetate film is heated at a heating rate of 10° C./min under a nitrogen atmosphere. This is preferable because a cellulose acetate film has better thermal stability. Meanwhile, a temperature at which the weight loss reaches 5% may be 350° C. or lower.

The weight loss can be measured using a thermobalance (TG-DTA2000-S available from MAC Science Co., Ltd.). Specifically, the cellulose acetate is heated at a heating rate of 10° C./min under a nitrogen atmosphere, and the weight change (relationship between the temperature and the weight) is measured. Then, the weight loss (%) at each temperature relative to the weight of the cellulose acetate at 100° C. is calculated.

Cellulose Triacetate I Crystal Structure

The cellulose acetate film according to an embodiment of the present disclosure contains cellulose acetate having a cellulose triacetate I crystal structure.

The fact that the cellulose acetate has a cellulose triacetate I (hereinafter also referred to as "CTA I") crystal structure can be identified by the appearance of typical peaks at two positions around $2\theta=7.6°$ (from 7.2 to 8.0°) and $2\theta=15.9°$ (from 15.5 to 16.3°) in a diffraction profile obtained from an X-ray diffraction photograph using CuKα ($\lambda=1.542184$ Å).

Similarly, the fact that cellulose acetate has a cellulose triacetate II crystal structure (hereinafter also referred to as "CTA II") can be identified by the appearance of typical peaks at three positions around $2\theta=7.9$ to 8.9°, $2\theta=9.9$ to 10.9°, and $2\theta=12.6$ to 13.6°.

The cellulose acetate film according to an embodiment of the present disclosure contains cellulose acetate having a cellulose triacetate I crystal structure and thus can have a small density and excellent strength.

The crystal structures of cellulose and cellulose acetate are now described. As the crystal structures of cellulose, there are a cellulose I crystal structure and a cellulose II crystal structure (Non-Patent Literatures 1 and 3). It is known that as the crystal structures of cellulose acetate obtained by modifying cellulose with acetyl groups, there are a cellulose triacetate I crystal structure (CTA I) and a cellulose triacetate II crystal structure (CTA II). (Non-Patent Literatures 1, and 3 to 7). The cellulose triacetate I crystal structure is considered to be a parallel-chain structure similar to that of the cellulose I crystal structure (Non-Patent Literature 4), and the cellulose triacetate II crystal structure is considered to be an antiparallel-chain structure (Non-Patent Literature 3). Further, it is considered that once a cellulose triacetate I crystal structure is converted to a cellulose triacetate II crystal structure, conversion to a cellulose triacetate I crystal structure does not occur (Non-Patent Literature 3).

The small specific gravity, high strength, and low linear thermal expansion coefficient of a cellulose nanofiber obtained from natural cellulose are considered to result from the fact that the cellulose nanofiber has a cellulose I crystal structure (cellulose I, and more precisely, cellulose I is a mixture of cellulose Iα and cellulose Iβ. (Non-Patent Literature 2)) in which all the cellulose molecular chains are oriented in the same direction to form a parallel-chain structure, and further result from the fact that the cellulose nanofiber has a microfibril fiber structure, containing a cellulose I crystal structure, in which about 36 cellulose molecular chains are assembled and arranged in parallel.

Average Degree of Substitution

The cellulose acetate of the cellulose acetate film according to an embodiment of the present disclosure preferably has an average degree of substitution (in other words, an acetyl substitution degree) from 2.0 to 3.0, more preferably from 2.1 to 2.9, and even more preferably from 2.2 to 2.8. When the acetyl substitution degree is within these ranges, the cellulose acetate has high hydrophobicity on the molecular surface, and the cellulose acetate film has excellent bending properties.

The average degree of substitution of the cellulose acetate can be measured by a known titration method in which cellulose acetate is dissolved in water and the average degree of substitution of the cellulose acetate is determined. For example, the following method can be used. A combined acetic acid of cellulose acetate is determined according to a method for measuring combined acetic acid specified in ASTM:D-817-91 (test methods for cellulose acetate etc.) and converted to average substitution degree by the following formula. This is the most common method for determining the average degree of substitution of the cellulose acetate.

$$\text{Average degree of substitution (DS)} = 162.14 \times \text{the combined acetic acid (\%)}/\{6005.2 - 42.037 \times \text{the combined acetic acid (\%)}\}$$

First, 1.9 g of dried cellulose acetate (sample) is precisely weighed and dissolved in 150 mL of a mixed solution of acetone and dimethylsulfoxide (volume ratio 4:1), and then 30 mL of a 1 N aqueous sodium hydroxide solution was added to saponify the cellulose acetate at 25° C. for 2 hours. Phenolphthalein is added as an indicator, and the excess sodium hydroxide is titrated with 1N-sulfuric acid (concentration factor: F). Further, a blank test is performed in the same manner, and the combined acetic acid of the sample is calculated by the following formula:

$$\text{Combined acetic acid (\%)} = \{6.5 \times (B - A) \times F\}/W$$

where A is a titration volume (mL) of 1N-sulfuric acid used for the sample, B is a titration volume (mL) of 1N-sulfuric acid used in the blank test, F is a concentration factor of 1N-sulfuric acid, and W is a weight of the sample.

Combined Sulfuric Acid Content

The cellulose acetate of the cellulose acetate film according to an embodiment of the present disclosure has a combined sulfuric acid content of preferably 500 ppm or less, more preferably 400 ppm or less, even more preferably 350 ppm or less, and most preferably 300 ppm or less. This is preferable because a cellulose acetate film has better thermal stability. In addition, the cellulose acetate may have a combined sulfuric acid content of 20 ppm or greater and 50 ppm or greater. This is because sulfuric acid is preferably used as a catalyst for the acetylation in the process of producing the cellulose acetate film, and when an effective amount of sulfuric acid as the catalyst for the acetylation is used, the combined sulfuric acid content in the resulting cellulose acetate is 20 ppm or greater.

The combined sulfuric acid content can be determined by the following method. A dried cellulose acetate is burned in an electric oven at 1300° C., and the sublimated sulfurous acid gas is trapped in a 10% hydrogen peroxide water and titrated with a normal aqueous solution of sodium hydroxide to measure the content in terms of $SO_4^{2-}$. The measured value is expressed in ppm as a sulfate content in 1 g of the cellulose ester in the absolute dry state.

Viscosity-Average Degree of Polymerization

The viscosity-average degree of polymerization of the cellulose acetate of the cellulose acetate film according to an embodiment of the present disclosure is preferably from 50 to 2500, more preferably from 400 to 2000, and even more preferably from 1000 to 1500. When the viscosity-average degree of polymerization is less than 50, the cellulose acetate tends to have poor strength. When the viscosity-average degree of polymerization exceeds 2500, it is difficult to perform defibrillation to allow the cellulose acetate fibers to have a number-average fiber diameter of 2 nm or greater and 400 nm or smaller.

The viscosity-average degree of polymerization (DP) can be determined by a method described by Kamide et al. in Polym J., 11, 523-538 (1979).

Cellulose acetate is dissolved in dimethylacetamide (DMAc) and a solution having a concentration of 0.002 g/mL is prepared. Then, the specific viscosity ($\eta_{rel}$, unit: mL/g) of this solution is determined at 25° C. by an ordinary method using an Ostwald viscometer. More specifically, the Ostwald viscometer used has efflux time in a blank test of 90 seconds to 210 seconds, the temperature of the solution to be measured is regulated in a thermostatic bath at 25±0.2° C. for 120 minutes or more, 10 mL of the solution is introduced into the Ostwald viscometer using a transfer pipette, and the efflux time of the solution is measured twice or more to determine an average as a measurement result. The measurement result is divided by the efflux time of a blank measured in the same manner to determine a specific viscosity. The natural logarithm of the thus determined specific viscosity (natural logarithmic of the specific viscosity) is divided by the concentration (unit: g/mL) to approximately determine a value of intrinsic viscosity ([η], unit: mL/g).

$$\eta_{rel} = T/T_0$$

$$[\eta] = (\ln \eta_{rel})/C$$

where T represents the efflux time (in seconds) of the measurement sample, $T_0$ represents the efflux time (in seconds) of the solvent alone, and C represents the concentration (g/mL).

The viscosity-average molecular weight can be determined by the following equation:

$$\text{Viscosity-average molecular weight} = ([\eta]/K_m)^{1/\alpha}$$

where $K_m$ and $\alpha$ are constants. In the case of cellulose triacetate, $K_m$ is 0.0264 and $\alpha$ is 0.750.

The viscosity-average degree of polymerization can be determined by the following equation:

$$\text{Viscosity-average degree of polymerization} = \text{viscosity-average molecular weight}/(162.14 + 42.037 \times \text{average degree of substitution (DS)})$$

The cellulose acetate of the cellulose acetate film according to an embodiment of the present disclosure may be fibrous cellulose acetate, in other words, cellulose acetate fiber.

Number-Average Fiber Diameter

The number-average fiber diameter of the cellulose acetate fiber may be from 2 nm to 400 nm. The number-average fiber diameter is preferably 4 nm or greater and 300 nm or smaller, and more preferably 6 nm or greater and 100 nm or smaller.

Here, the number-average fiber diameter of the cellulose acetate fiber is a value calculated from the fiber diameter (n≥6) measured based on an electron micrograph.

Application

The cellulose acetate film according to an embodiment of the present disclosure can be used in, for example, filter media, battery members such as separators, and transparent base materials.

Production of Cellulose Acetate Film

The cellulose acetate film according to an embodiment of the present disclosure can be produced by a method including the following steps: acetylating raw material cellulose by reacting the raw material cellulose with acetic anhydride in a solvent containing a poor solvent for cellulose acetate and acetic acid; diluting the cellulose acetate obtained by the acetylation with a dispersion medium to prepare a dispersion; fibrillating the cellulose acetate in the dispersion; removing non-fibrillated fibers from the fibrillated cellulose acetate; dialyzing cellulose acetate from which the non-fibrillated fibers have been removed against water; and drying the dialyzed cellulose acetate to form a film.

Raw Material Cellulose

A fibrous material such as wood pulp or cotton linters, and particularly, a fibrous material having a cellulose I crystal structure, can be used as the raw material cellulose. These raw material celluloses may be used alone or in combination of two or more. In this way, the cellulose acetate film according to an embodiment of the present disclosure effectively utilizes cellulose material, which is a naturally occurring biomass material.

Cotton linters will be described. Linter pulp has a high cellulose purity and contain fewer colored components. Therefore, linter pulp is preferred because the resulting cellulose acetate film has higher transparency.

Next, wood pulp will be described. Wood pulp is preferred because wood pulp can be stably supplied as a raw material and has a cost advantage over cotton linters.

Examples of the wood pulp include softwood pulp and hardwood pulp, and specific examples of the softwood pulp and the hardwood pulp include softwood bleached kraft pulp, hardwood bleached kraft pulp, softwood prehydrolyzed kraft pulp, hardwood prehydrolyzed kraft pulp, hardwood sulfite pulp, and softwood sulfite pulp. As will be described later, wood pulp can be disintegrated into fluff and used as disintegrated pulp. The disintegration can be performed using, for example, a disc refiner.

The α-cellulose content of the raw material cellulose is preferably 90 wt. % and above. This is so that the insoluble residue is reduced, and the resulting cellulose acetate film has higher transparency.

The α-cellulose content can be determined in the following manner. Pulp having a known weight is continuously subjected to extraction at 25° C. using a 17.5% aqueous sodium hydroxide solution and a 9.45% aqueous sodium hydroxide solution, and then a soluble fraction in the extraction solution is oxidized with potassium dichromate. The weight of β,γ-cellulose is determined from the volume of potassium dichromate used for oxidization. A value obtained by subtracting the weight of β,γ-cellulose from the initial weight of the pulp is defined as the weight of insoluble fraction of the pulp, that is, the weight of α-cellulose (TAPPI T203). The ratio of the weight of insoluble fraction of the pulp to the initial weight of the pulp is defined as the α-cellulose content (wt. %).

Disintegration

The method for producing a cellulose acetate film according to an embodiment of the present disclosure may include a step of disintegrating raw material cellulose (disintegration step). This makes it possible to uniformly perform an acetylation reaction in a short time. The disintegration step is particularly effective when wood pulp or the like is supplied in the form of sheets.

In the disintegration step, raw material cellulose is disintegrated by a wet disintegration or a dry disintegration. The wet disintegration is a method in which water or water vapor is added to wood pulp such as pulp sheets to disintegrate the wood pulp. Examples of the wet disintegration include: a method in which activation by water vapor and high-shear stirring in a reactor are performed; and a method in which disintegration is performed in a dilute aqueous acetic acid solution to obtain a slurry, and then the slurry is repeatedly subjected to liquid removal and acetic acid substitution, that is, so-called slurry pretreatment is performed. The dry disintegration is a method in which wood pulp, such as pulp sheets, is directly disintegrated in a dry state. Examples of the dry disintegration include: a method in which pulp is roughly disintegrated by a disc refiner having pyramid teeth and then finely disintegrated by a disc refiner having linear teeth; and a method in which a turbo mill is used which includes a cylindrical outer case having a liner attached to its inner wall, a plurality of discs that rotate at a high speed about the center line of the outer case, and a large number of blades radially attached around the center line in such a manner that each of the blades is located between the discs, and an object to be disintegrated is supplied into the outer case and disintegrated by three kinds of impact actions caused by hitting by the blades, collision with the liner, and high-frequency pressure oscillation generated by the action of the high-speed rotating discs, the blades, and the liner.

In the method for producing a cellulose acetate film according to an embodiment of the present disclosure, any one of these disintegration methods may be appropriately used. The wet disintegration is particularly preferred because the acetylation reaction can be completed in a short time and cellulose acetate having a high degree of polymerization can be obtained.

Pretreatment

The method for producing a cellulose acetate film according to an embodiment of the present disclosure preferably includes a pretreatment step in which disintegrated or non-disintegrated raw material cellulose is brought into contact with water, acetic acid, or water and acetic acid. The raw material cellulose may be brought into contact with water and acetic acid or may be brought into contact with only acetic acid without water. Here, acetic acid with a concentration from 1 to 100 wt. % can be used. Acetic acid may be an aqueous solution. Water, acetic acid, or water and acetic acid can be brought into contact with raw material cellulose by, for example, adding preferably from 10 to 8000 parts by weight of water, acetic acid, or water and acetic acid per 100 parts by weight of raw material cellulose.

Examples of a method for bringing raw material cellulose into contact with acetic acid include a method in which raw material cellulose is brought into direct contact with acetic acid and a method in which raw material cellulose is brought into contact with water to prepare a water-containing wet cake and acetic acid is added to the wet cake.

Examples of the method in which raw material cellulose is brought into direct contact with acetic acid include: a method in which acetic acid or acetic acid containing from 1 to 10 wt. % of sulfuric acid (sulfur-containing acetic acid) is added in one step; and a method in which acetic acid or sulfur-containing acetic acid is added in two or more separate steps, such as a method in which acetic acid is first added and then sulfur-containing acetic acid is added after a certain period of time, or a method in which sulfur-containing acetic acid is first added and then acetic acid is added after a certain period of time. More specifically, acetic acid and/or sulfur-containing acetic acid may be added by spraying it or them onto raw material cellulose and mixing the raw material cellulose.

The pretreatment can then be performed, for example, by adding acetic acid and/or the sulfur-containing acetic acid to the raw material cellulose and then allowing the mixture to stand at 17 to 40° C. for 0.2 to 48 hours or sealing and stirring the mixture at 17 to 40° C. for 0.1 to 24 hours.

The case where a wet cake of raw material cellulose is prepared before the raw material cellulose is brought into contact with acetic acid will be described. Here, raw material cellulose in the form of a wet cake is simply referred to as a wet cake. The wet cake can be produced by adding water to raw material cellulose, stirring the mixture, and separating the water by filtration. The raw material cellulose can be pretreated by repeating the operation of adding acetic acid to the wet cake, stirring the mixture, and separating the acetic acid by filtration several times, for example, about three times. The solid content concentration of the wet cake just after separating water or acetic acid by filtration is preferably from 5 to 50 wt. %.

When a wet cake of raw material cellulose is prepared, the raw material cellulose is preferably softwood bleached kraft pulp or softwood bleached sulfite pulp. This is because cellulose acetate having a relatively high degree of polymerization and excellent strength can be easily obtained.

Here, the solid content concentration of the wet cake can be determined in the following manner. About 10 g of part of a wet cake (sample) is weighed on an aluminum tray (W2), dried in a vacuum dryer at 60° C. for 3 hours, cooled in a desiccator to room temperature, and weighed (W3) to determine the solid content concentration of the sample according to the following formula:

Solid content concentration (%)=($W3-W1$)/($W2-W1$)×100 where W1 is a weight (g) of the aluminum tray, W2 is a weight (g) of the aluminum tray containing a sample before drying, and W3 is a weight (g) of the aluminum tray containing a dried sample.

When a wet cake of raw material cellulose is brought into contact with acetic acid, acetylation can be performed at a relatively low temperature in a relatively short time in an acetylation step that will be described later. This allows for easy control of temperature conditions and time conditions and easy handling of the raw material cellulose, which in turn increases the production efficiency of cellulose acetate film.

Acetylation

The following is the detailed description of the step of acetylating raw material cellulose by reacting it with acetic anhydride in a solvent containing a poor solvent for cellulose acetate and acetic acid (acetylation step). The raw material cellulose includes raw material cellulose that has been subjected to the disintegration step and the pretreatment step as well as raw material cellulose that has not been subjected to these steps.

More specifically, acetylation can be initiated by, for example, i) adding a poor solvent for cellulose acetate, acetic acid, acetic anhydride, and sulfuric acid to raw material cellulose. The order of addition may be different from the order above. Alternatively, acetylation may be initiated by ii) adding raw material cellulose to a mixture of a poor solvent for cellulose acetate, acetic acid, acetic anhydride, and sulfuric acid or iii) adding a previously-prepared mixture, such as a mixture of acetic acid, a poor solvent for cellulose acetate, and acetic anhydride, and sulfuric acid to raw material cellulose. The acetic acid used here is preferably one having a concentration of 99 wt. % or greater. The sulfuric acid used here is preferably one having a concentration of 98 wt. % or greater, that is, concentrated sulfuric acid.

By using a poor solvent for cellulose acetate, acetylation can be performed without breaking the microfibril fiber structure of the raw material cellulose. If the poor solvent is not used, produced cellulose acetate is dissolved in acetic acid used as a diluent in the acetylation reaction and the microfibril structure of the raw material cellulose is broken.

Needless to say, the poor solvent for cellulose acetate does not dissolve or hardly dissolves cellulose acetate. In addition, the poor solvent for cellulose acetate preferably well dissolves acetic anhydride. Examples of such a poor solvent for cellulose acetate include: aromatic hydrocarbons such as benzene, toluene, and xylene; aliphatic hydrocarbons such as cyclohexane and hexane; esters such as amyl acetate; and mixed solvents of two or more of them.

Among them, toluene and cyclohexane are preferred, and benzene is more preferred because the number of steps for separating and collecting waste liquid can be reduced or energy required for collection can be reduced.

The ratio between raw material cellulose, acetic acid, a poor solvent for cellulose acetate, and acetic anhydride used in the acetylation step will be described on for each case.

A case in which pretreatment is performed by bringing acetic acid into direct contact with raw material cellulose is described. The amount of a poor solvent for cellulose acetate is preferably from 100 to 5000 parts by weight, more preferably from 1000 to 2000 parts by weight per 100 parts by weight of raw material cellulose. The amount of acetic acid is preferably 0 to 2000 parts by weight, more preferably from 50 to 1000 parts by weight per 100 parts by weight of raw material cellulose. The amount of acetic anhydride is preferably from 200 to 1000 parts by weight, more preferably from 300 to 700 parts by weight per 100 parts by weight of raw material cellulose. When sulfuric acid is used as a catalyst, the amount of sulfuric acid is preferably from 1 to 30 parts by weight, more preferably from 5 to 20 parts by weight per 100 parts by weight of raw material cellulose.

A case in which raw material cellulose is pretreated with water to prepare a wet cake of the raw material cellulose before the raw material cellulose is brought into contact with acetic acid is described. When the solid content concentration of the wet cake is from 5 to 50 wt. %, the amount of acetic acid is preferably from 100 to 4000 parts by weight, more preferably from 200 to 3000 parts by weight, even more preferably from 1000 to 2000 parts by weight per 100 parts by weight of the wet cake. The amount of a poor solvent for cellulose acetate is preferably from 5 to 2500 parts by weight, more preferably from 50 to 1000 parts by weight per 100 parts by weight of the wet cake. The amount of acetic anhydride is preferably from 5 to 1000 parts by weight, more preferably from 10 to 500 parts by weight, even more preferably from 15 to 350 parts by weight per 100 parts by weight of the wet cake. The amount of sulfuric acid is preferably from 0.05 to 15 parts by weight, more preferably from 5 to 10 parts by weight per 100 parts by weight of the wet cake.

The temperature in the reaction system during the acetylation step is preferably 5 to 90° C., more preferably 10 to 75° C. In a case where the temperature in the acetylation reaction system is too high, depolymerization of the raw material cellulose is likely to proceed, causing excessive reduction in the viscosity-average degree of polymerization and reduction in the strength of the produced cellulose acetate fibers. On the other hand, in a case where the temperature in the acetylation reaction system is too low, the acetylation reaction does not proceed. As a result, the reaction requires an enormous amount of time, or conversion of cellulose to cellulose acetate cannot be performed.

The temperature in the acetylation reaction system can be adjusted by externally applying no heat to the inside and outside of the reaction system under stirring conditions, and/or heating or cooling the reaction system using a heating medium or a coolant under stirring conditions such that the reaction system is adjusted to an intermediate temperature. Alternatively, the temperature in the reaction system may be adjusted by heating or cooling acetic acid, a poor solvent for cellulose acetate, acetic anhydride, and sulfuric acid in advance.

The time taken for the acetylation reaction is preferably 0.5 to 20 hours. Here, the time taken for the acetylation reaction refers to the time from when raw material cellulose is brought into contact with a solvent, acetic anhydride, and a catalyst to start the reaction until when a product (cellulose acetate) is separated from a reaction mixture by filtration or the like. However, when chemically-modified pulp, such as TEMPO oxidized pulp, is used as raw material cellulose, the time taken for the acetylation reaction is preferably 0.5 to 60 hours.

In the early stage of the acetylation reaction, the reaction temperature may be 5° C. or lower such that the acetylation reaction is allowed to proceed while the depolymerization reaction is suppressed to reduce the amount of unreacted materials. In this case, the reaction temperature should be increased as slowly as possible, but from the viewpoint of productivity, the reaction temperature is preferably increased in 45 minutes or less, more preferably 30 minutes or less.

The average degree of substitution can be adjusted by adjusting the temperature or time of the acetylation reaction and the composition of a reaction bath such as the amount of acetic anhydride or the amount of sulfuric acid. For example, the average degree of substitution can be increased by increasing the temperature, prolonging the time, increasing the amount of sulfuric acid, or increasing the amount of acetic anhydride.

The acetylation reaction may be stopped by separating cellulose acetate as a solid from the reaction mixture of the acetylation and washing the solid with a poor solvent for cellulose acetate, such as toluene, to remove acetic anhydride and sulfuric acid. The separation can be performed by cooling the reaction mixture of the acetylation reaction and filtering the resulting solid. The filtration may be suction filtration.

Preparation of Dispersion

The following is the detailed description of the step of diluting cellulose acetate obtained by the acetylation with a dispersion medium to prepare a dispersion. The dispersion medium may be water, an organic solvent, or an organic solvent containing water. At this time, the amount of cellulose acetate is preferably from 0.1 to 10 wt. %, more preferably from 0.5 to 5.0 wt. %, with respect to the amount of water, an organic solvent, or an organic solvent containing water. In the fibrillation step that will be described later, when the solid content concentration is less than 0.1 wt. %, the amount of a liquid to be treated is too large, leading to reduced industrial production efficiency. Meanwhile, when the solid content concentration is greater than 10 wt. %, the fibrillation step may not proceed due to, for example, clogging in a fibrillation device.

Examples of the organic solvent include methanol, ethanol, 2-propanol, acetone, tetrahydrofuran, and methyl acetate. In addition, a mixture of these organic solvents and water can be also used.

When the acetylation reaction is stopped by washing with a poor solvent for cellulose acetate such as toluene, the cellulose acetate may be washed in advance with, for example, ethanol, before being diluted with a dispersing medium.

Defibrillation

The following is the detailed description of the step of fibrillating cellulose acetate in the dispersion (fibrillation step). In this way, the cellulose acetate can be refined into finer fibers. The fibrillation may be performed using a homogenizer.

A device used for defibrillation is not particularly limited, but is preferably one that can apply a strong shearing force, such as a high-speed rotation device, a colloid mill, a high-pressure device, a roll mill, and an ultrasonic device. Particularly, a wet high- or ultrahigh-pressure homogenizer that can apply a pressure of 50 MPa or greater and a strong shearing force to the dispersion liquid is preferably used to efficiently perform fibrillation. The pressure is more preferably 100 MPa or greater, even more preferably 140 MPa or greater. Prior to defibrillation and dispersion with the use of a high-pressure homogenizer, if necessary, the cellulose acetate may be subjected to pretreatment using a known mixing, stirring, emulsification, or dispersing device such as a high-shear mixer.

Here, when the pressure is 50 MPa or greater, resulting cellulose acetate fibers can have a number-average fiber diameter of 400 nm or less, and when the pressure is 100 MPa or greater, the number-average fiber diameter can be made smaller.

In the method for producing a cellulose acetate film according to an embodiment of the present disclosure, raw material cellulose is acetylated in a solvent containing a poor solvent for cellulose acetate and then fibrillated using a homogenizer. And thus, resulting cellulose acetate can maintain a microfibril fiber structure of natural cellulose.

Desulfation

In the method for producing a cellulose acetate film according to an embodiment of the present disclosure, when the cellulose acetate contains sulfate groups, it is preferable to perform desulfation, that is, removal of sulfate groups, after fibrillation of the cellulose acetate.

The sulfate groups can be removed by adjusting the pH of the dispersion containing cellulose acetate to 2 to 5 and keeping the dispersion at 15 to 100° C. for 0.5 to 48 hours.

Removal of Non-Fibrillated Fibers

The following is the detailed description of the step of removing non-fibrillated fibers from the fibrillated cellulose acetate. By removing the non-fibrillated fibers, impurities can be removed, and a cellulose acetate film having excellent bending properties and high transparency can be obtained. It is preferable to use a dispersion of cellulose acetate that does not contain non-fibrillated fibers. The removal of the non-fibrillated fibers may be performed by centrifuging to separate into supernatant and precipitate, removing the precipitate, and keeping the supernatant.

Dialysis

The following is the detailed description of the step of dialyzing the cellulose acetate from which non-fibrillated fibers has been removed against water. The supernatant obtained by centrifuging may be dialyzed against water using a dialysis membrane. By performing dialysis, impurities can be removed, and a cellulose acetate film having excellent bending properties and high transparency can be obtained. Examples of the dialysis membrane that can be used include Cellulose Tubing 36/32 (available from Viskase Companies, Inc.).

Film Formation

The following is the detailed description of the step of drying the dialyzed cellulose acetate to form a film. Cellulose acetate can be formed into a film by concentrating the dialyzed supernatant, placing it in a mold, and drying it. Drying is preferably performed in the presence of a desiccant such as diphosphorus pentoxide.

Each aspect disclosed in the present specification can be combined with any other feature disclosed herein.

EXAMPLES

Hereinafter, the present disclosure will be specifically described with reference to examples, but the technical scope of the present disclosure is not limited by these examples.

Each physical property of Examples and Comparative Examples to be described later were evaluated by the following methods.

Crystal Structure: X-Ray Diffraction

The crystal structure was examined by rendering a film sample (or sheet sample) into powder and subjecting the resulting powder to powder X-ray diffraction using an X-ray diffraction measurement device SmartLab, available from Rigaku Corporation, and a non-reflecting silicon plate.

Light Transmittance

The light transmittance (%) of a film sample (or sheet sample) at 660 nm was measured using a U-4000 spectrophotometer (available from Hitachi, Ltd.). In addition, the light transmittance (%) at 450 nm after heating for 3 hours at 100° C. was measured in the same manner.

Elongation

A film sample (or sheet sample) was conditioned overnight in an environment of 23° C. and 50% relative humidity; then, the film sample (or sheet sample) was pulled at a width of 10 mm, a span of 10 mm, and a speed of 5 mm/min using a small tabletop testing instrument EZ-LX Autograph (available from Shimadzu Corporation), and the elongation (maximum increase in length) (%) was measured.

Temperature at which Weight Loss Reaches 5%

The weight change by heating was measured using a thermobalance (TG-DTA2000-S available from MAC Science Co., Ltd.). Specifically, the weight change was examined at a heating rate of 10° C./min under a nitrogen atmosphere. A temperature (° C.) at which a weight loss reaches 5% is a temperature at which a 5% weight loss relative to weight at 100° C. was observed.

Combined Sulfuric Acid Content

The combined sulfuric acid content was measured as a content in terms of $SO_4^{2-}$ by burning a dried sample in an electric oven at 1300° C., trapping sublimated sulfurous acid gas in a 10% hydrogen peroxide water, and titrating with a normal aqueous solution of sodium hydroxide. The measured value was expressed in ppm as a sulfate content in 1 g of the cellulose ester in the absolute dry state.

Average Degree of Substitution: Degree of Acetyl Substitution

The combined acetic acid was determined by a method for measuring the combined acetic acid specified in ASTM:D-817-91 (Test method of cellulose acetate and the like). First, 1.9 g of a dried sample was precisely weighed and dissolved in 150 mL of a mixed solvent of acetone and dimethylsulfoxide (volume ratio 4:1); then, 30 mL of a 1 N aqueous solution of sodium hydroxide was added to saponify the sample at 25° C. for 2 hours. Phenolphthalein was added as an indicator, and excess sodium hydroxide was titrated with 1 N-sulfuric acid (concentration factor: F). Further, a blank test was performed in the same manner, and the combined acetic acid was calculated by the following formula:

$$\text{Combined acetic acid (\%)} = [6.5 \times (B-A) \times F]/W$$

where A represents the titration volume (mL) of the 1 N sulfuric acid for the sample, B represents the titration volume (mL) of the 1 N sulfuric acid for the blank test, F represents the concentration factor of the 1 N sulfuric acid, and W represents the weight of the sample.

The calculated combined acetic acid was converted by the following equation to determine the average degree of substitution:

$$\text{Average degree of substitution (DS)} = 162.14 \times \text{the combined acetic acid (\%)}/\{6005.2 - 42.037 \times \text{the combined acetic acid (\%)}\}$$

Viscosity-Average Degree of Polymerization

A sample was dissolved in dimethylacetamide (DMAc) to prepare a solution having a concentration of 0.002 g/mL. Then, the specific viscosity ($\eta_{rel}$, unit: mL/g) of this solution at 25° C. was determined by an ordinary method using an Ostwald viscometer. The natural logarithm of the specific viscosity was divided by the concentration (unit: g/mL) to approximately determine a value of intrinsic viscosity ([$\eta$], unit: mL/g).

$$\eta_{rel} = T/T_0$$

$$[\eta] = (\ln \eta_{rel})/C$$

where T represents the efflux time (in seconds) of the measurement sample, $T_0$ represents the efflux time (in seconds) of the solvent alone, and C represents the concentration (g/mL).

The viscosity-average molecular weight was determined by the following equation:

$$\text{Viscosity-average molecular weight} = ([\eta]/K_m)^{1/\alpha}$$

wherein $K_m = 0.0264$ and $\alpha = 0.750$.

Example 1

Pretreatment

First, 40 parts by weight of powdered cellulose (PC, product name "KC FLOCK W-50GK", available from Nippon Paper Industries Co., Ltd.) was pretreated by stirring in 2000 parts by weight of water at room temperature for 1 hour. Liquid was removed by suction filtration to obtain a wet cake (PC) having a solid content concentration of about 20 wt. %. This wet cake was dispersed in 2000 parts by weight of glacial acetic acid, and the dispersion was stirred at room temperature for 10 minutes. Liquid was removed by suction filtration, and a wet cake (PC) wetted with acetic acid was obtained. The solid content concentration of this acetic acid-wetted wet cake (PC) was about 35 wt. %. An operation of dispersing this wet cake (PC) wetted with acetic acid in glacial acetic acid again and removing liquid was performed twice. The solid content concentration of the acetic acid-wetted wet cake (PC) thus obtained was about 40 wt. %. The solid content concentration of the wet cake was measured by the method described above.

Acetylation

A mixture (mixed solvent) was prepared by mixing 648 parts by weight of toluene as a poor solvent for cellulose acetate, 72 parts by weight of acetic acid, 240 parts by weight of acetic anhydride, and 6 parts by weight of concentrated sulfuric acid. The temperature of this mixture was adjusted to 25° C.; the wet cake (PC) was added to the mixture, and the mixture was stirred at 25° C. for 3 Hour® s to form a reaction mixture. This reaction mixture was cooled to room temperature, the resulting solid was suction-filtered, and the solid was recovered. An operation of immediately washing this solid with 800 parts by weight of toluene was repeated twice to remove acetic anhydride and sulfuric acid associated with the solid, and thereby the acetylation reaction was stopped.

Washing and Preparation of Dispersion

The solid, which was crude cellulose acetate, was further washed with 800 parts by weight of ethanol twice and with 800 parts by weight of distilled water four times, resulting in a wet cellulose acetate. The wet cellulose acetate was diluted with distilled water to form a dispersion having a solid content of 1 wt. %.

Defibrillation

The obtained dispersion of cellulose acetate was pre-fibrillated with an Excel Auto Homogenizer (available from Nihonseiki Kaisha Ltd.) and then fibrillated by processing twice using a straight nozzle (100 MPa) and three times using a cross nozzle (140 MPa) of a high-pressure homogenizer (product name L-AS, available from Yoshida Kikai Co., Ltd.). A 1 wt. % dispersion of the fibrillated product of cellulose acetate was thus obtained.

Desulfation

Approximately 1.2 parts by weight of 0.5 M sulfuric acid was added to 400 parts by weight of the dispersion of the fibrillated product of cellulose acetate obtained, and the pH of the dispersion was adjusted to 2.5. The dispersion after pH adjustment was held at 90° C. for 6 hours, and the sulfate groups attached to the fibrillated product of cellulose acetate were removed. 1000 parts by weight of distilled water was added to the dispersion; then, approximately 150 parts of a 5% aqueous solution of sodium bicarbonate was added to the dispersion, and the pH of the dispersion was adjusted to 6.

Removal of Non-Fibrillated Fibers

The dispersion adjusted to pH 6 was centrifuged at room temperature at a rotation speed of 4000 rpm for 15 minutes using a tabletop centrifuge 4000 (available from KUBOTA Corporation) and separated into supernatant and precipitate. The supernatant was subjected to the following experiments.

Dialysis

The supernatant was dialyzed against an excess amount of distilled water for 3 days. A Cellulose Tubing 36/32 from Viskase Companies, Inc. was used as the dialysis membrane.

Film Formation

The dialyzed supernatant was concentrated three-fold. The resulting product was placed in a Teflon (registered trademark) mold and vacuum dried for 3 days in the presence of diphosphorus pentoxide to obtain a cellulose acetate film having a thickness of 20 µm.

Measurement of Physical Properties of Film

The physical properties of the obtained film are shown in Table 1. According to the measurements of the film sample, the combined sulfuric acid content was 290 ppm, the average degree of substitution was 2.35, the viscosity-average degree of polymerization was 585, and the temperature at which weight loss reached 5% was 284° C. Furthermore, a film sample was rendered into powder, treated at 230° C. for 10 minutes in a nitrogen atmosphere, and subjected to powder X-ray diffraction; diffraction was observed at $2\theta=7.9°$ and 15.8°, and it was determined that the film sample had a cellulose triacetate I crystal.

Production Example 1

(1) TEMPO (2,2,6,6-tetramethyl-1-piperidine-N-oxyl) Oxidation Treatment of Cellulose 30 g of softwood kraft pulp was immersed in 600 g of water and dispersed in a mixer. 0.3 g of TEMPO dissolved in 200 g of water and 3 g of sodium bromide was added to the dispersed pulp slurry, and the resulting mixture was further diluted with water to make the volume 1400 mL. The inside of the system was maintained at 20° C., and an aqueous solution of sodium hypochlorite was weighed and added dropwise so as to reach 10 mmol per 1 g of cellulose. The pH began to drop from the start of the dropwise addition of the aqueous solution of sodium hypochlorite; a 0.5 N aqueous solution of sodium hydroxide was added dropwise as needed to maintain the pH of the system at 10. After 3 hours, 30 g of ethanol was added to stop the reaction. 0.5 N hydrochloric acid was added to the reaction system to reduce the pH to 2. The oxidized pulp was filtered and washed repeatedly with 0.01 N hydrochloric acid or water to obtain an oxidized cellulose.

(2) Additional Oxidation Treatment of Oxidized Cellulose

Water was added to the oxidized cellulose obtained in (1) above so as to form a suspension having a solid content concentration of 10% with respect to a dry weight of 10 g of the oxidized cellulose, and 9 g of sodium chlorite and 100 mL of 5 M acetic acid were added to the suspension. The resulting product was reacted with stirring at room temperature for 48 hours and washed thoroughly with water to oxidize the aldehyde groups generated by the TEMPO oxidation treatment.

(3) Dispersion Treatment of Oxidized Cellulose After Additional Oxidation Treatment Water was added to 5 g of the oxidized cellulose obtained in (2) above to adjust the solid content to 1%, and a 1 N aqueous solution of sodium hydroxide was added while stirring to adjust the pH to 10. Then, using a mixer, the resulting product was refined to obtain a transparent cellulose nanofiber dispersion.

Production Example 2

Water was added to 5 g of a TEMPO-oxidized cellulose prepared in the same manner as in (1) of Production Example 1 above to adjust the solid content to 1%, and a 1 N aqueous solution of sodium hydroxide was added while stirring to adjust the pH to 10. Then, using a mixer, the resulting product was refined to obtain a transparent cellulose nanofiber dispersion.

Production Example 3

Water was added to 5 g of a TEMPO-oxidized cellulose prepared in the same manner as in (1) of Production Example 1 above to adjust the solid content to 1%, and a 10% aqueous solution of tetraethylammonium hydroxide was added while stirring to adjust the pH to 10. Then, using a mixer, the resulting product was refined to obtain a transparent cellulose nanofiber dispersion.

Production Example 4

Water was added to softwood bleached kraft pulp (40 g by dry weight) to adjust the solid content to 2%. The mixture was roughly broken up by a mixer. The mixture was then repeatedly treated with a grinding mill to obtain a white creamy cellulose nanofiber dispersion.

Comparative Example 1

The cellulose dispersion obtained in Production Example 1 and the cellulose nanofiber dispersion obtained in Production Example 4 were mixed at a ratio (weight ratio) of 8:2; the mixture was casted onto a polystyrene container and dried in an oven at 50° C. for 24 hours to obtain a cellulose nanofiber sheet having a thickness of 20 μm. The evaluation results of the physical properties are shown in Table 1.

Comparative Example 2

A cellulose nanofiber sheet having a thickness of 20 μm was obtained in the same manner as in Comparative Example 1 with the exception that the cellulose dispersion obtained in Production Example 1 and the cellulose nanofiber dispersion obtained in Production Example 4 were mixed at a ratio of 5:5. The evaluation results of the physical properties are shown in Table 1.

Comparative Example 3

A cellulose nanofiber sheet having a thickness of 20 μm was obtained in the same manner as in Comparative Example 1 with the exception that the cellulose dispersion obtained in Production Example 1 and the cellulose nanofiber dispersion obtained in Production Example 4 were mixed at a ratio of 2:8. The evaluation results of the physical properties are shown in Table 1.

Comparative Example 4

A cellulose nanofiber sheet having a thickness of 20 μm was obtained in the same manner as in Comparative Example 2 with the exception that the cellulose dispersion obtained in Production Example 2 was used instead of the cellulose dispersion obtained in Production Example 1. The evaluation results of the physical properties are shown in Table 1.

Comparative Example 5

A cellulose nanofiber sheet having a thickness of 20 μm was obtained in the same manner as in Comparative Example 2 with the exception that the cellulose dispersion obtained in Production Example 3 was used instead of the cellulose dispersion obtained in Production Example 1. The evaluation results of the physical properties are shown in Table 1.

TABLE 1

| | | Light transmittance (%) | | | Temperature at which | Combined sulfuric | Average | Viscosity-average |
| | Crystal structure | 660 nm | 450 nm (100° C., after 3 h) | Elongation (%) | weight loss reached 5% (° C.) | acid content (ppm) | degree of substitution (—) | degree of polymerization (—) |
|---|---|---|---|---|---|---|---|---|
| Example 1 | Cellulose triacetate I crystal | 85.5 | 84.3 | 8.0 | 284 | 290 | 2.35 | 585 |
| Comparative Example 1 | Cellulose I crystal | 90.8 | 90.2 | 3.5 | — | 0 | 0 | — |
| Comparative Example 2 | Cellulose I crystal | 87.6 | 87.2 | 5.0 | — | 0 | 0 | — |
| Comparative Example 3 | Cellulose I crystal | 76.3 | 74.1 | 6.5 | — | 0 | 0 | — |
| Comparative Example 4 | Cellulose I crystal | 88.2 | 85.1 | 5.0 | — | 0 | 0 | — |
| Comparative Example 5 | Cellulose I crystal | 88.5 | 85.4 | 6.8 | — | 0 | 0 | — |

Compared to the cellulose nanofiber sheets of the Comparative Examples, the film of the Example maintained comparable light transmittance while exhibiting superior elongation. Therefore, it can be seen that the film of the Example has both excellent bending properties and high transparency.

The invention claimed is:

1. A cellulose acetate film comprising cellulose acetate having a cellulose triacetate I crystal structure, the cellulose acetate film having a light transmittance of 70% or higher at 660 nm.

2. The cellulose acetate film according to claim 1, having an elongation of 7% or higher when conditioned at 23° C. and 50% relative humidity.

3. The cellulose acetate film according to claim 1, wherein a temperature at which a weight loss of the cellulose acetate film relative to weight at 100° C. reaches 5% is 200° C. or higher when the cellulose acetate film is heated at a heating rate of 10° C./min under a nitrogen atmosphere.

4. The cellulose acetate film according to claim 3, wherein the temperature at which the weight loss of the cellulose acetate film reaches 5% is 250° C. or higher.

5. The cellulose acetate film according to claim 1, wherein a combined sulfuric acid content in the cellulose acetate is 20 ppm or greater and 500 ppm or less.

6. The cellulose acetate film according to claim 1, wherein the cellulose acetate has an average degree of substitution from 2.0 to 3.0.

7. The cellulose acetate film according to claim 1, wherein a diffraction profile obtained from powder X-ray diffraction of the cellulose acetate film has peaks at two positions of 2θ=7.2 to 8.0° and 2θ=15.5 to 16.3°.

8. A method for producing a cellulose acetate film, the method comprising:
  acetylating raw material cellulose by reacting the raw material cellulose with acetic anhydride in a solvent containing a poor solvent for cellulose acetate and acetic acid;
  diluting the cellulose acetate obtained by the acetylation with a dispersion medium to prepare a dispersion;
  fibrillating the cellulose acetate in the dispersion;
  removing non-fibrillated fibers from the fibrillated cellulose acetate;
  dialyzing cellulose acetate from which the non-fibrillated fibers have been removed against water; and
  drying the dialyzed cellulose acetate to form a film.

9. The method for producing the cellulose acetate film according to claim 8, wherein the step of removing the non-fibrillated fibers from the fibrillated cellulose acetate is performed by centrifuging to separate into supernatant and precipitate, and removing the precipitate.

10. The method for producing the cellulose acetate film according to claim 9, wherein the supernatant obtained by centrifuging is dialyzed against water using a dialysis membrane to form a dialyzed supernatant.

11. The method for producing the cellulose acetate film according to claim 10, wherein cellulose acetate is formed into a film by concentrating the dialyzed supernatant, placing the dialyzed supernatant in a mold, and drying the dialyzed supernatant.

12. The method for producing the cellulose acetate film according to claim 8, wherein the poor solvent for cellulose acetate is at least one selected from the group consisting of benzene, toluene, xylene, cyclohexene, hexane, and amyl acetate.

13. A cellulose acetate film consisting of cellulose acetate having a cellulose triacetate I crystal structure, the cellulose acetate film having a light transmittance of 70% or higher at 660 nm.

* * * * *